United States Patent
He et al.

(10) Patent No.: US 6,715,316 B2
(45) Date of Patent: Apr. 6, 2004

(54) WATER-REMOVABLE COATINGS FOR LCD GLASS

(75) Inventors: Lin He, Horseheads, NY (US); Adrienne M. Powell-Johnson, Horseheads, NY (US); Youchun Shi, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/941,182

(22) Filed: Aug. 27, 2001

(65) Prior Publication Data

US 2003/0110800 A1 Jun. 19, 2003

Related U.S. Application Data

(60) Provisional application No. 60/289,465, filed on May 8, 2001.

(51) Int. Cl.[7] .............................................. C03C 17/28
(52) U.S. Cl. ................ 65/23; 65/61; 65/60.3; 427/154; 427/165; 427/292; 427/353
(58) Field of Search ................ 65/23, 61, 60.3; 427/168, 169, 165, 163.1, 154, 292, 353, 443.2, 421

(56) References Cited

U.S. PATENT DOCUMENTS

| 632,014 A | * | 8/1899 | Hackelberg |  |
|---|---|---|---|---|
| 2,824,411 A | * | 2/1958 | Goodwillie et al. | 65/60.3 |
| 3,338,696 A |  | 8/1967 | Dockerty |  |

(List continued on next page.)

FOREIGN PATENT DOCUMENTS

| JP | 53-118285 | 10/1978 |
| JP | 61-071932 | 4/1986 |
| JP | 04/7456 | 1/1992 |
| JP | 63-132989 | 6/1998 |
| JP | 2000-319038 | 11/2000 |

OTHER PUBLICATIONS

Lelah, Michael, et al., "Wettability of Soda–Lime Glass: The Effect of Cleaning Procedures", Ceramic Bulletin, vol. 58, No. 11, pp. 1121–1124 (1979).*
"Polysaccharides I: Structure and Function," *Essentials of Carbohydrate Chemistry*, J. F. Robyt, editor, Springer, New York 1998, 157–227.
"Polysaccharides I: Structure and Function" and "Polysaccharides II: Chemical Modifications and Their Applications," *Essentials of Carbohydrate Chemistry*, J. F. Robyt, editor, Springer, New York 1998, 157–168, 177–178, and 228–244.
Evans, R. B. and Wurzburg, O. B., "Production and Use of Starch Dextrins," *Starch: Chemistry and Technology*, vol. 2, R. L. Whistler and E. F. Paschall, editors, Academic Press, New York, 1967, 254–278.
Glass, J. E., *Water–Soluble Polymers*, American Chemical Society, Washington, D. C., 1986, 14–15.

*Primary Examiner*—Sean Vincent
(74) *Attorney, Agent, or Firm*—Maurice M. Klee

(57) ABSTRACT

Removable coatings for protecting glass sheets and, in particular, for protecting LCD glass sheets during cutting, grinding, shipping, and/or storage are provided. The coatings comprise one or more polysaccharides, with the preferred polysaccharides being starches composed of a mixture of amylose and amylopectin molecules. The coatings can be removed from the glass sheets using water solutions, e.g., a mild detergent solution, in combination with, for example, ultrasonic cleaning and/or brush cleaning. After removal, the glass sheets have substantially the same surface characteristics and chemistry as untreated sheets and also have particle/contamination levels equivalent to those of control sheets held in a clean environment.

26 Claims, 1 Drawing Sheet

U.S. PATENT DOCUMENTS

| | | | |
|---|---|---|---|
| 3,577,256 A | * 5/1971 | Benford et al. | 65/60.3 |
| 3,682,609 A | 8/1972 | Dockerty | |
| 3,997,693 A | * 12/1976 | Kircher | 65/60.3 |
| 4,079,025 A | * 3/1978 | Young et al. | |
| 4,171,403 A | 10/1979 | Haynes et al. | |
| 4,397,913 A | * 8/1983 | Fahey | |
| 4,878,973 A | * 11/1989 | Ohtake et al. | |
| 5,144,736 A | 9/1992 | Hanson | |
| 5,955,518 A | 9/1999 | Flautt | |
| 5,998,766 A | * 12/1999 | Mizosaki et al. | |
| 6,233,972 B1 | 5/2001 | Foster et al. | |
| 6,379,746 B1 | 4/2002 | Birch et al. | |

OTHER PUBLICATIONS

Greenway, T. M., "Water–Soluble Cellulose Derivatives and Their Commercial Use," *Cellulosic Polymers, Blends, and Composites*, R. D. Gilbert, editor, Hanser Publishers, New York, 1994, 173–188.

Kitamura, S., "Starch Polymers, Natural and Synthetic," *Polymeric Materials Encyclopedia*, J. C. Salamone, editor, CRC Press, Boca Raton, Florida, 1996, 7915–7922.

* cited by examiner

WATER-REMOVABLE COATINGS FOR LCD GLASS

CROSS REFERENCE TO RELATED APPLICATION

This application claims the benefit under 35 USC §119(e) of U.S. Provisional Application No. 60/289,465 filed May 8, 2001.

I. FIELD OF THE INVENTION

The present invention is directed to temporarily protecting glass sheets, and, in particular, to temporarily protecting the surfaces of glass sheets used in producing liquid crystal displays (LCDs). The invention is useful, for example, in protecting such sheets from ambient contaminants and for preventing glass chip adhesions to the sheets during cutting or grinding. In addition, the invention can protect the sheets from scratching.

II. BACKGROUND OF THE INVENTION

Many uses of glass, including LCD glass, require a very clean glass surface that is substantially free of dust and organic contaminants. When exposed to the environment, glass can quickly become contaminated with organic contaminants, with contamination being observed within a few minutes.

Current procedures used to cut and grind glass surfaces and edges often generate small glass chips (e.g., chips having a size greater than 1 micron and less than about 100 microns). Some of these particles irreversibly adhere to the clean glass surface, rendering the glass useless for many applications. This is particularly a serious problem in the case of LCD glass surfaces.

LCD glass can be made by a fusion draw process, which yields flat, smooth glass surfaces which can be cut or ground to the desired size. Some of the glass chips generated from the cutting process originate from the surface of the glass. When the flat surface of these chips comes into contact with the surface of the glass plate, there can be a large contact area between the chips and the glass surface which promotes strong adhesion. If a water film condenses between these two surfaces, permanent chemical bonding may occur, in which case the adhesion of the glass chips to the surface becomes irreversible.

One known method of protecting glass sheets, specifically, sheets of LCD glass, is to apply a polymer film on both major surfaces of the glass to protect the glass during the scoring, breaking and beveling processes. In a typical method, one major surface has a polymer film attached with an adhesive, and the other major surface has a film attached by static charge. The first film is removed after the edge finishing (cutting or grinding) of the sheet is completed, while the second is removed prior to the finishing process. Although the adhesive-backed film protects the surface from scratching by the handling equipment, it causes other problems. For example, the polymer may entrap glass chips produced during the finishing process, leading to a build up of glass chips and scratching of the glass surface, particularly near the edges of the surface. Another problem with this film is that it may leave an adhesive residue on the glass surface. A further problem with the film approach is glass breakage during peeling of the film from the glass surface, especially for large and/or thin glass sheets. There is a need, therefore, for a method of protecting a glass surface from chip adhesions that does not leave residual coating on the glass surface, and for a method of temporarily protecting glass surfaces, whereby a glass article with a clean, coating-free surface can be readily obtained for further use.

A critical aspect of any coating used to temporarily protect LCD glass is removability. Manufacturers of liquid crystal displays use LCD glass as the starting point for complex manufacturing processes which typically involve forming semiconductor devices, e.g., thin film transistors, on the glass substrate. To not adversely affect such processes, any coating used to protect LCD glass must be readily removable prior to the beginning of the LCD production process.

In view of the foregoing, there has been a need in the art for a method for protecting glass sheets, specifically, sheets of LCD glass, which has the following characteristics:

(1) the method preferably should be one that can be readily incorporated in the overall glass forming process, specifically, at the end of the forming process, so that newly formed glass is protected substantially immediately after it is produced; among other things, to meet this criterion, the coating material should be (a) able to withstand the environment (e.g., high temperatures) of a glass forming line and (b) the method of applying the material should be safe for use in such an environment;

(2) the coating must protect the glass from chip adhesion resulting from cutting and/or grinding of the glass sheet, as well as the adhesion of other contaminants, e.g., particles, that the glass may come into contact with during storage and shipment prior to use;

(3) the coating must be sufficiently robust to continue to provide protection after being exposed to the substantial amounts of water which typically come into contact with the glass sheet during the cutting and/or grinding process;

(4) the coating preferably should protect the glass sheet from scratching during handling, shipping, and storage (as used herein, scratching includes abrasion);

(5) the coating must be substantially completely removable from the glass prior to its ultimate use in, for example, producing a liquid crystal display; and (6) the coating should preserve the pristine glass surface without changing the surface's chemistry or smoothness as a result of the coating being on the glass during handling, shipping, and storage.

The present invention addresses and satisfies this long standing need in the art.

III. SUMMARY OF THE INVENTION

The present invention provides methods for temporarily protecting a surface of a glass sheet from (1) ambient dirt, (2) chip adhesions, and (3) in its preferred embodiments, scratching.

In accordance with a first of its aspects, the invention provides a method for temporarily protecting glass from glass chips and/or scratching, said glass having at least one substantially flat surface, said method comprising:

(A) protecting the surface by:
  (i) applying an aqueous solution comprising at least one polysaccharide (e.g., a starch) to the surface, said surface having a contact angle less than or equal to 8° prior to the application of said aqueous solution; and
  (ii) removing water from the aqueous solution to leave a polysaccharide-containing coating on the surface having a thickness of at least 0.01 microns (typically, the coated surface will have a contact angle of at least 25°, e.g., around 30°); and (B) subsequently removing the polysaccharide-containing coating from surface using an aqueous solution;

wherein the surface has a contact angle after step (B) which is less than or equal to 8°.

In accordance with this aspect of the invention, the method can comprise the additional steps between steps (A) and (B) of:

(a) cutting the glass; and (b) grinding and/or polishing at least one edge of the cut glass;

wherein:

water or a water-containing solution is applied to the coated surface during at least one of steps (a) and (b);

the surface of the coating has a first contact angle prior to steps (a) and (b) and a second contact angle after steps (a) and (b); and the first and second contact angles differ by less than 5°.

In accordance with a second of its aspects, the invention provides an article of manufacture comprising:

(a) a glass sheet having at least one substantially flat surface; and (b) a coating comprising at least one polysaccharide on the surface, said coating having a thickness of at least 0.01 microns;

wherein:

(i) the coating protects the surface from glass chips and/or scratching; and (ii) the coating is removable from the surface through the application of an aqueous solution.

In certain preferred embodiments of the invention, the polysaccharide-containing coating is formed as part of the manufacturing process for the glass, wherein the manufacturing process produces newly formed glass at an elevated temperature and the newly formed glass is at a temperature above 150° C. when it first comes into contact with the polysaccharide-containing aqueous solution. Although integration into a glass manufacturing process is preferred, the invention can also be practiced off-line if desired.

In other preferred embodiments, the coating is applied by spraying onto hot glass. Other approaches for applying the coating can be used, e.g., dipping, meniscus coaters, wick coaters, etc., but are less preferred when the invention is used as part of a glass manufacturing process since hot glass can often exhibit substantial back-and-forth movement at the end of such a process, especially, when a overflow downdraw process is used.

In further preferred embodiments, the coating is removed using an aqueous detergent solution, e.g., a commercial detergent package, preferably in combination with brush washing and/or ultrasonic cleaning. Typically, the aqueous detergent solution used to remove the coating will be heated to a temperature in the range from 40° C. to 75° C.

Other aspects of the invention are described in detail below.

IV. BRIEF DESCRIPTION OF THE DRAWINGS

V. DETAILED DESCRIPTION OF THE INVENTION

Figure 1:
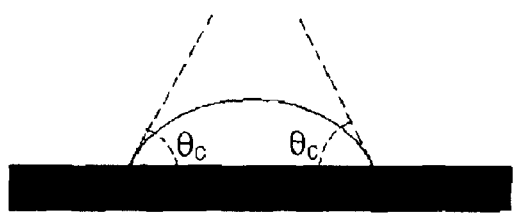
FIG. 1 illustrates the measurement of contact angles (also known as sessile contact angles) of water drops on a glass substrate.

As embodied and broadly described herein, the present invention provides a method for temporarily protecting the surface of a glass sheet by providing a removable coating on the surface of the sheet.

In terms of liquid crystal display glass, particle-free sheets (substrates) are of critical importance since they are the starting point for determining the quality of the LCD thin film transistors formed on the sheets. As discussed above, adhesion of glass particles to substrates is a long standing problem in the manufacture of LCD glass. In particular, scoring at the bottom of draw (BOD) is a main source of adherent particles during substrate manufacturing. Ultrasonic cleaning and brush cleaning can remove some particles that have been deposited on the glass for a short time. However, cleaning processes are not effective for particles deposited on a substrate for more than a few days, especially if the storage environment is hot and humid.

Therefore, it is highly desirable to have a protective coating that can prevent particles from adhering to the LCD glass surface at the bottom of draw. Additionally, it is also desirable for the particle protective coating to provide abrasion resistance. Besides protecting substrates from glass particle contamination and abrasion, the coating must be removable with reasonable cleaning kinetics using mild cleaning procedures, e.g., a cleaning procedure that includes an ultrasonic detergent wash at 40° C. combined with some brushing (e.g., a wash with 2% SEMICLEAN KG). Organic solvent cleaning is not preferred due to health, environmental and safety concerns.

Many commercial products are water-soluble but they are not necessarily washable from the glass surface using the above cleaning conditions due to strong interactions with the glass surface. For example, there are many organic coatings having good water solubility at higher temperatures. However, the cleaning temperature of 40° C. is too low for many of them to be completely removed from the glass surface. Moreover, although good aqueous solubility is a must, a coating should not be highly hygroscopic because it must be able to survive in a hot and humid environment without decreasing its coating effectiveness. Also, in order to not change the surface chemistry of the glass, the coating should not be chemically active.

A. Polysaccharide Coatings

As discussed above, the coatings of the invention are composed of at least one polysaccharide. More particularly, the coatings of the invention preferably consist essentially of polysaccharides. As used herein, the phrase "consists essentially of" excludes other components that may materially affect the coating. Thus, "a coating consisting essentially of at least one polysaccharide" contains the at least one polysaccharide and may also comprise other components that do not materially affect the coating, such as binders, solvents, and the like.

A wide variety of polysaccharides are known in nature. General discussions of polysaccharides and polysaccharide chemistry can be found in the following references, the relevant portions of which are incorporated herein by reference: Greenway, T. M., "Water-Soluble Cellulose Derivatives and Their Commercial Use," *Cellulosic Polymers, Blends, and Composites*, R. D. Gilbert, editor, Hanser Publishers, New York, 1994, 173–188; Evans, R. B. and Wurzburg, O. B., "Production and Use of Starch Dextrins," *Starch: Chemistry and Technology*, Volume 2, R. L. Whistler and E. F. Paschall, editors, Academic Press, New York, 1967, 254–278; Kitamura, S., "Starch Polymers, Natural and Synthetic," *Polymeric Materials Encyclopedia*, J. C. Salamone, editor, CRC Press, Boca Raton, Fla., 1996, 7915–7922; and "Polysaccharides I: Structure and Function" and "Polysaccharides II: Chemical Modifications and Their Applications," *Essentials of Carbohydrate Chemistry*, J. F. Robyt, editor, Springer, New York 1998, 157–227 and 228–244.

Water solubility is low for most of the raw natural polysaccharides, but manufacturers degrade and modify natural products, e.g., by acid or enzymatic hydrolysis, to fit different industrial applications, such as, food, paper, pharmaceuticals, personal care, and paint. Depending on the modification, polysaccharides having a variety of water solubilities and viscosities are commercially available.

Starch derivatives, e.g., corn starch derivatives, and cellulose ethers, e.g., the METHOCEL cellulose ethers sold by Dow Chemical, are the most common industrial polysaccharides. Low molecular weight products have excellent water solubility. They tend to form glossy, tough and flexible coatings. Since these materials are used in foods and in the pharmaceutical industry, e.g., in the manufacture of pills, coatings made from these materials are non-toxic.

The METHOCEL family of polysaccharides includes two basic types of cellulose ethers: methylcellulose and hydroxylpropyl methylcellulose. Like starch, cellulose is composed of chains of D-glucose units but it has a different glycoside linkage configuration, i.e., its polymeric backbone is an all linear, $\beta$-1,4-glucosidic chain. This configuration results in various property differences between cellulose and starches. For example, naturally occurring cellulose is water insoluble with high molecular weights up to 2,000,000.

Depending on how the cellulose is modified, cellulose ether products can have a variety of different properties, such as, water solubility, surface activity and thickening. The METHOCEL products are named according their hydroxyl substitution degree (the first letter) and viscosity (the number following the first letter). Tables 1 and 2 illustrate this system of coding of the METHOCEL grades, where the viscosities of Table 2 are for METHOCEL A. Since there are only three hydroxyl groups in one glucopyranosic ring, the maximum degree of substitution is 3.

The METHOCEL cellulose ethers are water soluble, but when a solution of this material is heated above a predetermined temperature, a gel forms. METHOCEL films can be made by evaporating water from a METHOCEL solution and the resulting films are clear, tough, flexible and non-toxic. In a low temperature aqueous solution, films can be rehydrated to form a gel and then go back into solution.

In addition to the starches and cellulose products discussed above, other polysaccharides that can be used in the practice of the invention include hydroxyethyl cellulose derivatives, exudate gums and their derivatives, and alginates. A single polysaccharide or a mixture of polysaccharides can be used in the practice of the invention, e.g., the coating can comprise one polysaccharide or a mixture of two, three, or more polysaccharides. Alternatively, a plurality of coatings each comprising a different polysaccharide may be sequentially applied to the glass surface.

The mixtures and/or plural coatings can be within one class of polysaccharides (e.g., a mixture of starches) or can be across classes (e.g., a mixture of a cellulose ether and a starch). The most preferred polysaccharides for use in the invention are starches. As used herein, the terms "starch" and "starches" includes both water soluble starches and water soluble starch derivatives.

B. Starch Coatings

Starches are naturally occurring polymers. Potato, corn, tapioca, wheat and many other plants are commercial sources of starches. Some of the basic properties of starches are water solubility and biodegradability, i.e., degradation by microorganisms.

Chemically, starch is a polymer of D-glucose linked via $\alpha$-1,4- or $\alpha$-1,6-glucosidic binding. There are two kinds of starch polymer structures, namely, amylose structures and amylopectin structures. Amyloses are linear starch molecules formed via $\alpha$-1,4-glucosidic binding. Amylopectins are branched starch molecules in which several short linear amylose chains with 20 to 25 D-glucose units each are linked via $\alpha$-1,6-glucosidic bindings.

Native starches exist as cold water-insoluble granules. The granules are composed of amylose and amylopectin molecules associated by hydrogen bonding either directly or via water hydrates to form oriented micelles or crystalline areas. When water is added, starch granules absorb water and swell. With increasing temperature, the granules swell further and the viscosity of the solution increases. At the point of maximum viscosity, the starch granule structure is destroyed. Thereafter, the viscosity decreases gradually and a clear solution forms after the temperature passes the point of maximum viscosity.

Compared to native starches, starches suitable for use in the present invention have lower molecular weights and lower viscosities as a result of acid or enzyme degradation of the native material or of high molecular weight starch products derived from native starches. These lower molecular weights and lower viscosities result in coatings that dry much faster and are easier to wash from the glass surface with an aqueous detergent solution. These acid or enzyme degraded starches also have excellent solubility in cold water. These degraded starch products are sometimes called dextrins.

Water-based spray coating is the preferred method for applying these coatings to glass substrates for particle and abrasion protection. For such applications, the aqueous solution preferably has a viscosity between 0.1 centipoise and 100 centipoise. The coatings can be removed from protected glass surfaces in reasonable times, typically between 2 to 15 minutes, in a relatively low temperature aqueous detergent solution, e.g., a solution having a temperature between 30° C. and 75° C.

Examples of suitable starches are PURITY GUM 59, a waxy maize starch product which has been degraded by an enzyme and modified by propylene oxide, and CRYSTAL TEX 627, an acid-hydrolyzed tapioca starch dextrin. Both of these products are available from National Starch and Chemical Company, Bridgewater, N.J. They have low solution viscosities, i.e., 1 to 2 cps at 2.5% concentration, they form glossy and non-hygroscopic tough films, and they do not gel at the temperatures normally used for coating removal, e.g., temperatures of around 40° C.

C. Optional Coating Components

As discussed above, starch coatings are biodegradable, which means that they are attacked by microorganisms such as bacteria and fungi. Other polysaccharides are also subject to such attack. Accordingly, the coatings of the invention preferably include a biocide to eliminate or decrease microorganism attack on the coating during storage and shipment. Commercial biocides such as KATHON LX (Rohm & Haas) and DOWICIL 75 (Dow Chemical Company) are examples of biocides that can be used for this purpose. Boric acid can also be used to control the growth of microorganisms.

The coatings can also include one or more plasticizers which may be a polyhydroxy compound. Examples of suitable plasticizers include sorbitol, glycerol, ethylene glycol, polyethylene glycol, and mixtures thereof. Such compounds can reduce the tendency of the coating to become brittle at low humidities. They can also improve the smoothness, abrasion resistance, and elongation of the coatings.

Preferably, the coatings of the invention do not include organic or other molecules which have strong adhesion to glass surfaces and thus would be difficult to remove from the glass surface. Examples of such molecules include long carbon chain ionic surfactants (e.g., more than 18 carbons), silanes, and siloxanes.

Typical concentrations for the aqueous coating solutions of the invention are as follows where the values given are weight percents based on the total final weight of the solution:

Polysaccharide component—0.1% to 30% with lower concentration values being preferred if the polysaccharide (e.g., starch) produces a high viscosity solution.

Biocide—50 ppm to 0.1% depending on the effectiveness of the biocide. Because biocides may change the chemical and mechanical properties of the coating, the biocide concentration should not exceed 20% of the weight of the polysaccharide component.

Plasticizer—0% to 30%.

The above list of optional components is not exhaustive and other components can be included in the coatings of the invention if desired.

D. Application of the Coating

The coatings of the invention are preferably applied to the glass surface by spraying a solution of the polysaccharide and an aqueous solvent (e.g., deionized water) onto the surface and evaporating the aqueous solvent to form the coating. For example, the coating solution can be applied to a glass surface having a temperature in the range of 20–250° C. using an air spray gun with 20 to 60 psi pressure.

As discussed above, the coating is preferably applied to a newly formed sheet of glass immediately after the forming process. In particular, the aqueous solution is applied to the glass while its temperature is above 100° C., preferably above 150° C., and most preferably above 180° C., where the temperature of the glass is preferably measured with an infrared detector of the type commonly used in the glass making art.

Polysaccharides and, in particular, starches start to decompose above about 250° C. Thus, the preferred glass temperature at the point of coating application is less than 250° C., a temperature which newly-formed glass reaches quite quickly in, for example, a fusion draw glass manufacturing facility. However, since a polysaccharide/water solution is being applied and since water has a high evaporation heat, the evaporation of water at the glass surface will cool the glass quickly. Thus, the coating solution can be applied to, for example, 300° C. glass without significant decomposition.

The temperature of the aqueous solution is preferably in the range of 20° C. to 85° C., i.e., heated solutions can be used. One benefit of using a heated solution is to help dry the coating when the glass substrate temperature is less than 150° C. Also, a heated solution has a lower viscosity than a room temperature solution which can be beneficial in achieving atomization of the solution. The temperature of the aqueous solution, of course, should be below the gel point of the polysaccharide used for those polysaccharides that have a gel point.

Application of the coating as part of the glass manufacturing process is advantageous because the glass is clean, and the coating will protect the glass during the remainder of the manufacturing process. Application of a coating to glass at elevated temperatures means that the application time may need to be relatively short depending on the rate at which the glass is being formed and the desired minimum glass temperature at the end of the application process (see below).

The glass may be formed by several different processes, including float processes, slot-draw processes, and fusion draw processes. See, for example, U.S. Pat. Nos. 3,338,696 and 3,682,609, which are incorporated herein by reference in their entirety. In the slot-draw and fusion draw processes, the newly-formed glass sheet is oriented in a vertical direction. In such cases, the aqueous solution should be applied under conditions that do not result in the formation of drips since such drips can interfere with cutting of the glass, e.g., the drips can cause the glass to crack. In general terms, dripping can be avoided by adjusting the spray level to keep the glass at a temperature above 100° C. throughout the coating process. As the spray level is adjusted, e.g., reduced, the concentration of polysaccharide in the solution also needs to be adjusted, e.g., increased, to insure that an adequate amount of polysaccharide reaches the surface to completely coat the surface of the glass.

Rather than spraying, the coating can also be applied from a flexible material impregnated with a solution of the coating material. Other possibilities include dipping, meniscus coating, rollers, brushes, spin-coating, or any other process which brings the coating solution into contact with the glass surface. Spraying is considered most preferred since it readily accommodates movement of the glass introduced by the glass manufacturing process. Typically, both sides of the glass will be sprayed simultaneously, although sequential coating of individual sides can be performed if desired.

The coating thickness should be above 0.01 $\mu$m and is preferably less than 50 $\mu$m. Most preferably, the coating thickness is between 0.1 and 20 $\mu$m. When the coating is too thin, pin holes occur easily, i.e., a continuous layer of polysaccharide is not formed. When the coating is too thick, it takes too long to remove the coating from the glass surface and the overall usage of coating materials is high.

E. Removal of the Coating

A key to a successful protective coating is having it survive the manufacturing process and still be removable when desired. Coatings composed of polysaccharides can be applied to the glass before it is scored for the first time and are robust enough to survive the rest of the manufacturing process. They can be removed by using various commercial detergent packages either alone or in combination with brush washing and/or ultrasonic cleaning. As a further alternative, oxidization of the coating, e.g., ozone-based oxidation, can be employed either alone or in combination with other techniques for removal, although removal with a detergent solution is preferred.

More particularly, water-based ultrasonic cleaning or brush cleaning or a combination thereof are suitable for removing the polysaccharide coatings of the invention. The use of a detergent, on the other hand, is mainly required to remove other contamination such as oily materials and particles. Typically, the aqueous detergent solution will be used at a concentration of 2–8% and will have an alkaline pH. A cleaning temperature between 20° C. and 75° C. is suitable, with higher temperatures normally resulting in more efficient removal of the coating, particles, and organic contaminants. Cleaning time is normally between 2 to 15 minutes.

It should be noted that the removal of the coating can be done by the manufacturer of the glass or the glass can be shipped to the ultimate user, e.g., a manufacturer of liquid crystal display devices, and the user can remove the coating from the glass.

To verify removal of a coating, the wetability of the glass surface before and after coating removal can be measured. This can be done easily by measuring the contact angle of a liquid drop on the surface, which can be performed by a variety of techniques known in the art. A schematic diagram of the contact angle measurement is shown in FIG. 1, where $\theta_c$ is the contact angle, also referred to in the art as the sessile drop contact angle. Advantageously, the contact angle of sessile water drops on the glass surface after removal of the coating has a value of less than or equal to 8 degrees. Other methods that can be used to determine coating removal include ESCA and TOF-SIMS.

F. Representative Benefits of the Invention

One of the benefits of this invention is its ability to protect glass sheets from ambient contaminants which the glass may be exposed to during, for example, storage or transportation.

Another benefit is the ability of the invention to reduce chip adhesions when a glass sheet is cut or ground. As discussed above, glass chip adhesions present a significant problem in the manufacture of cut or ground glass, particularly in the manufacture of LCD glass.

In particular, the present invention reduces the formation of chip adhesions by providing a stable removable coating on the surface of the glass sheet. As used herein, the phrase "stable removable coating" means a coating that is bonded to the glass and that is not removed or significantly degraded during handling, storage and shipping, but is removable during the cleaning stage. The coating adheres to the glass via interactions with the silica on the glass surface, and acts as a barrier between the surface of the glass and the glass chips. Because the coating reduces or prevents glass chips from coming into contact with the surface of the glass sheet, the occurrence of chip adhesion is reduced.

A further advantage of the invention is that the surface of the glass sheet after removal of the coating has substantially the same chemistry and smoothness as it had prior to application of the coating. For example, the glass surface preferably has a RMS surface roughness less than or equal to 0.36 nanometers as measured by atomic force microscopy (AFM) after removal of the coating.

G. EXAMPLES

The following examples provide detailed illustrations of the invention, and are not intended to limit the scope of the invention to the specific embodiments described therein.

Example 1

Four starches (PURITY GUM 59, N-TACK, NADEX 772 and CRYSTAL TEX 627) were obtained from National Starch and Chemical Company (Bridgewater, N.J.) and a fifth (EMSIZE CMS 60) from Kalamazoo Paper Chemicals (Richland, Mich.). These starch products are produced by hydrolyzing raw starches using an enzyme or acid. Although they are all made from raw starches, they have different molecular weights, pH's, and chemical modifications. They are also made from different raw materials.

Table 3 describes some of the differences among these products. All these products are polydispersed and thus they have a relatively broad molecular weight distribution, with the weight average molecular weight being less than the natural starches and more than 5,000. EMSIZE CMS 60 has the highest average molecular weight, with PURITY GUM 59 being the next highest. The lowest average molecular weight products are CRYSTAL TEX 627 and NADEX 772.

Seven METHOCEL brand cellulose ethers acquired from Dow Chemical (Midland, Mich.) were also tested.

The glass substrates used in the testing were 1737 LCD glass samples (5'×5'×0.7 mm) produced by Corning Incorporated (Corning, N.Y.). Each sheet was covered on one side with a polymer film attached with an adhesive, and the other major surface had a film attached by static charge. Both coatings were removed and the side covered with the film attached by static charge was spray-coated.

The procedures used in the experiment were: (1) pre-cleaning of the substrates and determination of the level of cleanliness using water contact angle; (2) heating substrates and spray coating them; (3) measuring the water contact angle of the coated substrates; (4) removing the coatings; and (5) determining the level of cleanliness of the substrates after removal of the coatings, again using the contact angle method.

The pre-cleaning of substrates as well as the removal of coatings used the following steps: (1) 2% SEMICLEAN KG was sprayed on the substrates or coatings and hand-scrubbing performed using a cleanroom cloth; (2) the substrates or coatings were subjected to ultrasound cleaning (40 kHz, 2% SEMICLEAN KG, 40° C.–50° C.) for 15 minutes; and (3) the substrates or coatings were subjected to brush cleaning and spin-drying using a brush cleaner (ULTRATECH 605 Photomask/Substrate Cleaner).

The substrate temperature at which the spray coating takes place affects the properties of the coating. At higher temperatures, a coating material becomes drier and also has a greater tendency to experience chemical changes such as decomposition or oxidation. These changes may strongly influence the adhesion force between the glass surface and the coating material. If the substrate temperature is too low, coatings dry very slowly and leave coating drips on the surface. Slow drying and coating drips are undesired.

As discussed above, the coatings of the present invention can be applied to substrates having temperatures of, for example, 200° C.–300° C. To simulate these temperatures in a laboratory setting, pre-cleaned cold substrates were pre-heated on a hot plate and removed from the hot plate for spraying. Temperatures of substrates just before removing from the hot plate (T1) and just before spraying (T2) as measured using a thermocouple are shown in Table 4. The data indicated that the spraying temperature was lower than 190° C. if the substrate temperature was 300° C. on the hot plate, and the spraying temperature was a little higher than 200° C. if the substrate temperature was slightly higher than 350° C. There was some deviation due to manual operation, and therefore, substrates were removed from the hot plate when the temperature was around 340±10° C. for coating experiments so that the starting coating temperature would be around 200° C.

Contact angle was used as the major characterization tool for coating removal since it is the quickest and easiest method to use. Starches and METHOCELs are organic polymers and have lower surface energy than a glass surface so that higher water contact angles are observed for these coatings. If a glass surface is very clean without polymer residues, the water contact angle will be extremely low due to the high surface energy of glass. Thus, the surface energy difference between a clean glass surface and a polymer coating as indicated by the change in water contact angle upon removal of the coating can be used to determine macroscopically if a coating has been removed. Microscopic methods can be used to supplement the contact angle information to determine if a coating is removed completely without trace residues (see Example 2).

Table 5 summarizes water contact angle results for the starches and METHOCELs that were tested. The smallest water contact angle that could be measured by the equipment used was 8 degrees and thus this value was used as an indicator of a clean surface. That is, prior to application of a coating the glass surface had a contact angle less than or equal to 8°.

All five of the low viscosity starch products were found to be removable using the above cleaning process. The N-TACK coating was stickier than the other coatings, which is generally undesirable. PURITY GUM 59 and N-TACK have a pH more close to neutral. PURITY GUM 59 is an amylopectin-only polymer. Compared with the linear amylose structure, the branched amylopectin has better solubility. EMSIZE CMS 60 has a high pH value because it is a sodium salt of a methylcarboxylate. Such a high pH may be undesirable since it may cause surface etching during long term storage and transportation.

The data in Table 5 indicate that none of the METHOCEL coatings was completely removed even though the molecular weights of these products are comparable to those of the starch products tested. Although not wishing to be bound by any particular theory of operation, it is believed that the METHOCEL coatings were not completely removed because of inter-molecular/intra-molecular hydrogen bonding of the METHOCEL molecules. See J. E. Glass, *Water-Soluble Polymers*, American Chemical Society, Washington, D.C., 1986, 14.

All the starches tested contained more than 70% amylopectin. In the amylopectin backbone structure, there are numerous branched sub-structures. Cellulose ethers, on the other hand, only have a linear backbone. The branched structure disrupts the hydrogen bonding between starch molecules and makes such products more soluble than METHOCEL products for the same molecular weight. The linear structure also introduces stronger hydrogen bonding between the cellulose ether molecules and the glass surface. All of these effects are believed to contribute to METHOCEL molecules being more difficult to remove than the starches.

When boric acid was added to METHOCEL solutions, all of the METHOCEL coatings were completely removed from the glass surface. It is believed that adding boric acid reduces the interaction sites of the METHOCEL molecules with the glass surface.

In order to determine if biocides affect the washability of the coatings, two common biocides, i.e., DOWICIL 75 made by Dow Chemical and KATHON LX made by Rohm and Haas, were tested. The data in Table 6 show that coatings with biocides are still easily removed by the cleaning processed discussed above. Therefore, biocides can be used without adversely affecting coating removal.

The effect of an "activated" glass surface was examined by subjecting pre-cleaned glass substrates to a heat treatment before application of starch coatings. Specifically, the substrates were pre-heated to 600° C. in a laboratory furnace for 20–30 minutes and allowed to cool to 350–380° C. before removal from the furnace. The substrates were then placed on a hot plate and coated in accordance with the procedures described above. The coating took place within 30 to 90 minutes after the samples were removed from the furnace. Table 6 lists the water contact angles of substrates treated in this way. As can be seen in this table, the starch coatings were removable from the activated surface.

The above results show that the polysaccharides of the invention and, in particular, the starches of the invention have excellent water-solubility and leave little residue on glass surfaces.

Example 2

Three of the starch coatings of Example 1, i.e., PURITY GUM 59, CRYSTAL TEX 627, and EMSIZE CMS 60, were tested for their particle protection ability.

In outline, the experimental procedure used included the following steps: (1) pre-clean glass substrates and measure initial particle count; (2) dip-coat substrates and air-dry the coating; (3) heat substrates for 2 minutes; (4) contaminate substrates with glass particles by scraping edges of two pieces of LCD glass on uncoated control and coated substrates; (5) age the particle-contaminated substrates and all controls in a humidity chamber with 85% humidity/85° C. for 7 days; (6) clean the substrates; and (7) count particles on cleaned substrate.

The change in particle count on a substrate was obtained by comparing the particle count before and after the process. Particle protection effectiveness of a coating was estimated by comparing particle density changes on coated and uncoated substrates.

Particle contamination and aging were performed in a normal chemical laboratory. Cleaning, coating and particle inspection were done in a cleanroom. The purpose of doing the coating in a cleanroom was to keep the glass substrates away from unknown contamination sources. Spray-coating has a great potential to contaminate a cleanroom and thus dip-coating was performed in the cleanroom for these experiments.

The substrates were 5'×5' square pieces of 1737 LCD glass, 0.7 mm thick. The glass substrates were pre-cleaned using hand scrubbing followed by ultrasonic cleaning in a 2% SEMICLEAN KG solution. The initial number of particles on the cleaned substrates was measured after they had been dried in air.

The cleaned substrates were immersed in a coating solution (<5 seconds) piece by piece, and taken out for air drying over night. Dried substrates were heated at 200° C. for 2 minutes to simulate the spray-coating temperature. Except for some controls kept in pre-cleaned cases individually (see below), all particle-contaminated samples on a first open PYREX rack and all uncontaminated samples on a second open PYREX rack were placed in an oven set to 100° C. for 5 minutes. This pre-heating was performed to avoid water condensation on cold substrates in the high temperature/high humidity chamber which could wash away some of the coating. The substrates were immediately transferred to TEFLON racks and placed in a humidity chamber with 85% humidity at 85° C. The substrates were taken out of the humidity chamber after 7 days for cleaning.

The cleaning was performed by: (1) rinsing the substrates with room-temperature deionized water, after which the substrates were placed in deionized water to prevent drying out; (2) hand-scrubbing with 2% SEMICLEAN KG at 40° C.; (3) ultrasonication (72 kHz) in 2% SEMICLEAN KG at 40° C. for 15 minutes; (4) flood-rinsing with deionized water; (5) ultrasonication (40 kHz) in deionized water at 40° C. for 3 minutes; (6) ultrasonication (72 kHz) in deionized water at 40° C. for 5 minutes; (7) flood-rinsing with deionized water; and air drying. A variety of ultrasonication frequencies were used in order to provide cleaning for a greater range of particle sizes.

Particle numbers were counted using a CCD camera to detect light scattering. The equipment provided information regarding particles of all sizes and particles larger than or equal to 10 microns.

Four different control samples were used to identify sources of contamination and as benchmarks for coated samples as follows (see also Table 7):

Control A: uncoated and uncontaminated. This control was kept in a pre-cleaned TEFLON case. The case was opened only in cleanroom.

Control B: uncoated but contaminated with glass particles. This control was used to determine the effectiveness of the coating in providing particle protection.

Control C: uncoated and uncontaminated. The difference between this control and Control A is that this control was exposed to the exact same environment as the coated/contaminated substrates. This control could thus detect contamination sources other than the scraped glass particles.

Control D: coated but uncontaminated with particles. This control provided information regarding contamination from the coating itself.

Tables 8 to 11 summarize the change in particle density for the different substrates from before the coating (initial) to after the final cleaning (final). The column entitled "Increase of macro-contamination area" shows that the increase in heavily contaminated area, i.e., the area with a particle density exceeding 25 particles/mm$^2$. The next column shows the adjusted (corrected) particle density increase, which is calculated based on the final and initial particle densities in the area without macro-contamination. Each coating solution or control was done in triplicate, and the average of adjusted density increase and its standard deviation are listed in the final column. Negative values in the tables mean the final particle density was lower than the initial density.

As indicated above, the particle counting equipment provided information for particles larger than or equal to 10 $\mu$m ($\geq$10 $\mu$m) and for all particles detected (>0 $\mu$m). (Number of particles>0 $\mu$m=Number of particles between 0 $\mu$m and 10 $\mu$m+Number of particles$\geq$10 $\mu$m) All macro-contamination data are based on particles>0 $\mu$m. The data of Tables 8 and 10 are for all detected particles (>0 $\mu$m) and the data of Tables 9 and 11 are for particles greater than or equal to 10 $\mu$m ($\geq$10 $\mu$m).

Some samples had macro-contamination and others did not. Samples with macro-contamination were much more contaminated than the adjusted particle density suggests. It is difficult to compare a sample with macro-contamination to that without macro-contamination using adjusted particle density values. However, all Control A samples and almost all the starch-coated samples (except for one piece) did not have macro-contamination, while all Control B and C samples had macro-contamination. Coated samples can thus be compared with Control A samples without concern for macro-contamination. Maximum values of density are used for comparison in some cases to take account of relatively large particle density deviations compared to average values.

Results for Controls

Since the samples of Control A were kept in a clean environment, they were expected to be the cleanest samples. In the first experimental run (Tables 8 and 9), only one Control A sample survived to the end of the process. The more statistically accurate data for Control A are listed in Tables 10 and 11 for the second experimental run. Compared with the samples of Control B, Control A samples were much cleaner at both the >0 $\mu$m level and the $\geq$10 $\mu$m level. All Control B samples had macro-contamination while no Control A sample did. At the >0 $\mu$m level, the maximal adjusted particle density increase of Control A was 0.24+ 0.25=0.49 particles/cm$^2$ but that of Control B was 3.76+ 1.35=5.11 particles/cm$^2$ (see Table 10). Thus, Control A was about 10×cleaner. At the $\geq$10 $\mu$m level, the maximal particle density of Control A was 0.00+0.06=0.06 particles/cm$^2$ but that of Control B was 1.87+0.42=2.29 particles/cm$^2$ (see Table 11). Control A was thus 30× to 40× cleaner. Because there was no macro-contamination for Control A, and the macro-contamination area was not calculated for the adjusted particle density of Control B, Control B was even more contaminated than the particle density numbers indicate.

Even though the Control C samples had not been directly contaminated with glass particles, they still exhibited macro-contamination. The reason is that there was no protection for these samples and thus they could pick up contamination from the environment. Omitting the macro-contamination area, these samples had about 2× more particles at the >0 level and 6× more particles at the $\geq$10 $\mu$m level than Control A samples.

Purity Gum 59

Statistically, the PURITY GUM coated samples were as clean as the Control A samples at both particle size levels. None of them exhibited macro-contamination. Generally, there were 10× to 20× less particles on samples coated with a 2.5% solution of this starch compared to Control B samples without consideration of the macro-contamination area of the Control B samples.

Particle density on coated substrates slightly increased at the >0 $\mu$m level but remained about the same at the $\geq$10 $\mu$m level as the coating solution concentration was increased from 2.5% to 10%. Particle density on contaminated and uncontaminated samples coated at the 5% level were almost the same, which suggests that the small particle density increase with higher concentration was not caused by scraped glass particles. This, in turn, suggests that the particle density increase with coating solution concentration may be caused by coating material residues at higher concentrations. Since the particle density did not change at the $\geq$10 $\mu$m level, the coating material residue sizes appear to have been smaller than 10 $\mu$m. Further cleaning procedures, e.g., brush-cleaning, could be used to remove these residues, although in general residues <10 $\mu$m are not a serious concern.

As shown in Tables 10 and 11, addition of cetyltrimethylammonium bromide, a cationic surfactant with a single C16 carbon chain, to a 5% PURITY GUM solution resulted in an increase in particle density compared to the same starch used at the same concentration but without the surfactant.

The AFM and ESCA data of Tables 12 and 13, respectively, indicate that after final cleaning, the surfaces of PURITY GUM coated samples were as smooth as those of Control A samples if not smoother, and there were no obvious chemical composition changes to the glass caused by the application of the coating. (In these tables, the AFM data is in nanometers and the ESCA data is in wt. %. All of the AFM data represents duplicate measurements on the same substrate at two different spots.) Carbon data is not included in Table 13 because all samples were not measured on the same day. However, all PURITY GUM and CRYSTAL TEX samples were measured together with a Control A sample and the carbon concentrations for all these samples were in the same range.

Crystal Tex 627

CRYSTAL TEX 627, which has a lower viscosity than PURITY GUM 59, gave excellent particle protection at concentrations of 5% and 10% (see Tables 10 and 11), with no macro-contamination observed at either concentration. The coatings resulted in surfaces as clean as the Control A samples at both the >0 $\mu$m level and the $\geq$10 $\mu$m level. As shown by Control D, particle contamination on this coating did not result in a higher particle density. The scatter in the data for the 2.5% concentration is believed to be due to the ultra low viscosity of this solution, which could result in coverage defects. AFM and ESCA showed that the coating did not alter the surface roughness and chemical composition (see Tables 12 and 13).

Emsize Cms 60

EMSIZE CMS 60 was the most viscous starch among those tested, although it still qualifies as a low viscosity starch.

As shown in Tables 10 and 11, at a concentration of 2.5%, there was no macro-contamination, indicating that the coating provided good particle protection. At the $\geq$10 $\mu$m level, there was no significant particle density increase but at the >0 $\mu$m level, particle density increased to a level which was only about 3× cleaner than the unprotected samples of Control B. This particle density may be caused by starch coating residues resulting from the higher molecular weight of this product. Further cleaning procedures, e.g., brush-cleaning, could be used to remove these residues, if desired. However, as indicated above, residues<10 $\mu$m are generally not of particular concern.

The AFM data of Table 12 shows that EMSIZE-protected substrates were as smooth as Control A, while the ESCA data of Table 13 shows the presence of a small amount of sodium residue which is generally undesirable for an LCD substrate.

In sum, the above data shows that starch coatings provided excellent particle protection, with each of the tested coatings keeping LCD substrates virtually as clean as control substrates kept in a particle free environment.

Example 3

Figure 2:
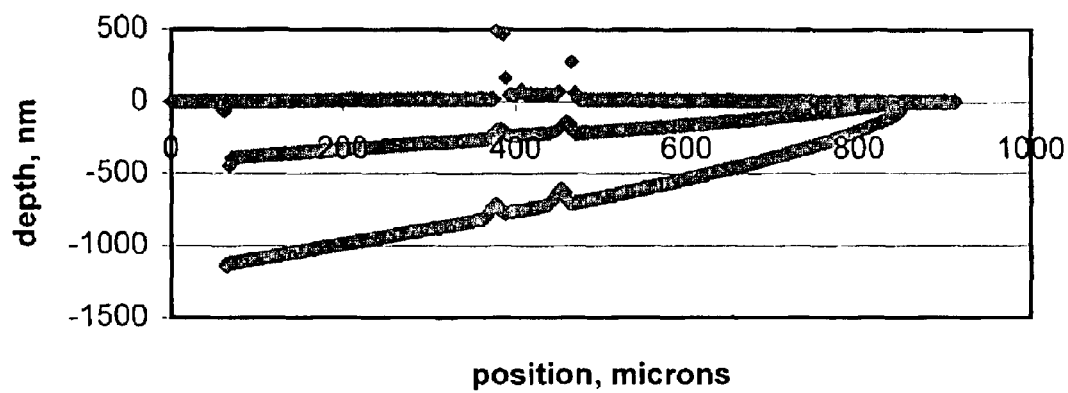
FIGS. 2 and 3 are PROFILOMETER traces illustrating the scratch resistance of the coatings of the invention.

Nano-indentation scratch tests were performed on glass substrates which were coated with CRYSTAL TEX 627 (5% solution) using the techniques of Example 2. The results are shown in FIG. 2. Each of these graphs contains three line traces representing the surface profile along the scratch path before scratching, during scratching (under load), and after scratching (load removed). In particular, the top curve is a PROFILOMETER trace showing the pre-scratch surface profile, the bottom (deepest) trace shows the penetration of the scratch tip during the scratching process, and the middle trace shows the final depth of the scratch following elastic recovery. The estimated thickness of the coating was 1500 nm.

Neither this data nor microscopic examination showed any indication of a complete penetration through the coating to the glass interface. This was true even with load levels up to a peak load of 160 mN (16 grams).

Figure 3:
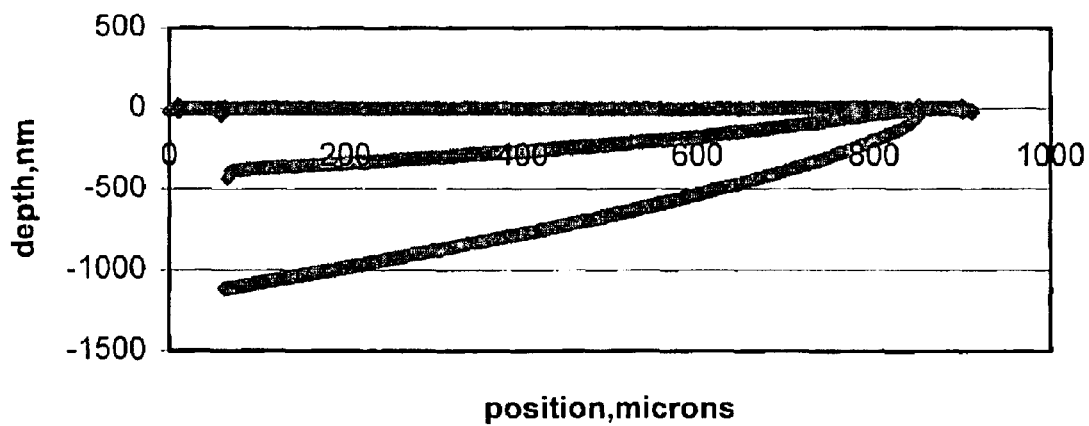

FIG. 3 shows a corresponding set of traces for a coating that had been exposed to deionized water for 10 minutes prior to scratch testing. Due to the nature of the instrument used, there was a delay of a few minutes (2–4 minutes) between the time the water was removed from the coating and the start of testing.

The water exposure changed the visual appearance of the coating in that it eliminated circular drying patterns that could be seen in the original coating. However, as can be seen in FIG. 3, there was no change in the scratch response (scratch resistance) of the coating due to this water exposure.

As indicated above, the results of FIGS. 2 and 3 are for an initial coating thickness of 1500 nm. Thicker coatings can be expected to provide even greater scratch resistance and thinner coatings somewhat less resistance.

Example 4

The procedures of Example 2 were repeated using a 5% CRYSTAL TEX 627 solution and a three month holding period in the 85% humidity/85° C. chamber, rather than a 7 day holding period. The results are shown in Tables 14 and 15, where the particle densities are for the $\geq 10$ $\mu$m level. (The AFM and ESCA data in Table 15 are in nanometers and wt. %, respectively.) As can be seen in these tables, the starch coating provided excellent particle protection and ambient contamination protection and did not change the surface characteristics or chemistry of the glass surface even after this prolonged storage period.

The above examples are intended as illustrations only and do not limit the scope of the invention. It will be apparent to those skilled in the art that various modifications and variations can be made to the processes and compositions of this invention. The appended claims are intended to cover such modifications, variations, and equivalents.

TABLE 1

| Product | Methoxyl substitution | Methoxyl % | Hydroxypropyl substitution | Hydroxypropyl % |
|---|---|---|---|---|
| METHOCEL A | 1.8 | 30 | — | — |
| METHOCEL E | 1.9 | 29 | 0.23 | 8.5 |
| METHOCEL F | 1.8 | 28 | 0.13 | 5.0 |
| METHOCEL K | 1.4 | 22 | 0.21 | 8.1 |

TABLE 2

| Viscosity, mPa · s (2%, 20° C.) | Number average degree of polymerization | Number average molecular weight |
|---|---|---|
| 5 | 53 | 10,000 |
| 10 | 70 | 13,000 |
| 40 | 110 | 20,000 |
| 100 | 140 | 26,000 |
| 400 (4M) | 220 | 41,000 |

TABLE 3

| | PURITY GUM 59 | N-TACK | CRYSTAL TEX 627 | NADEX 772 | EMSIZE CMS 60 |
|---|---|---|---|---|---|
| Source | Waxy corn | Waxy corn | Tapioca | Corn | Potato |
| Starch type | Amylopectin | Mixture | Mixture (25–27% amylose; 73–75% amylopectin) | Mixture | Mixture |
| Modification | Propylene oxide ether | No | No | No | Carboxy-methylated |

TABLE 3-continued

| | PURITY GUM 59 | N-TACK | CRYSTAL TEX 627 | NADEX 772 | EMSIZE CMS 60 |
|---|---|---|---|---|---|
| pH (10% solution) | 4.5–6.5 | 5–6 | 3–4 | 3 | 9.5–11.5 |
| Solution color | Clear | Clear | Slightly yellow | Light tan | Clear |
| Manufacturer | National Starch and Chemical Co. | National Starch and Chemical Co. | National Starch and Chemical Co. | National Starch and Chemical Co. | Emsland Starke GMBH |

TABLE 4

| Substrate | T1 (° C.) | T2 (° C.) |
|---|---|---|
| 1 | 300 | 186 |
| 1 | 353 | 201 |
| 2 | 300 | 186 |
| 2 | 355 | 212 |
| 3 | 306 | 198 |
| 3 | 361 | 207 |

TABLE 5

| Coating solution | Contact angle before cleaning | Contact angle after cleaning |
|---|---|---|
| Starches | | |
| 2.5% PURITY GUM 59 | 31 | <8 |
| 2.5% N-TACK | 29 | <8 |
| 2.5% CRYSTAL TEX 627 | 32 | <8 |
| 2.5% NADEX 772 | 30 | <8 |
| 2.5% EMSIZE CMS 60 | 28 | <8 |
| METHOCELS (methylcellulose and hydroxypropyl methylcellulose) | | |
| 2.5% E3LV | 39 | 29 |
| 2.5% E6LV | 45 | 29 |
| 2.5% A15LV | 54 | 16 |
| 0.5% A4M | 56 | 15 |
| 2.5% K35LV | 42 | 19 |
| 2.5% F50 | 49 | 20 |
| 0.5% F4M | 57 | 18 |
| METHOCEL + boric acid | | |
| 2.5% E6LV + 0.4% boric acid | 40 | <8 |
| 0.5% A4M + 0.1% boric acid | 48 | <8 |
| 0.5% F4M + 0.1% boric acid | 57 | <8 |

TABLE 6

| Coating solution | Contact angle before cleaning | Contact angle after cleaning |
|---|---|---|
| Biocides | | |
| 5% PURITY GUM 59 + 50 ppm KATHON LX | 46 | <8 |
| 5% PURITY GUM 59 + 0.1% DOWICIL 75 | 48 | <8 |
| Substrates treated at 600° C. | | |
| 5% PURITY GUM 59 + 50 ppm KATHON LX | 45 | <8 |
| 5% CRYSTAL TEX 627 + 50 ppm KATHON LX | 54 | <8 |

TABLE 7

| | # of samples | Coating | Particle contamination | Container or holder |
|---|---|---|---|---|
| Control A | 3 | No | No | Clean case |
| Control B | 3 | No | Yes | Rack I |
| Control C | 3 | No | No | Rack II |
| Control D | 3 | Yes | No | Rack II |
| Coated samples | 3 | Yes | Yes | Rack I |

TABLE 8

| Samples | Contaminated with particles | Particle density (#/cm$^2$) initial | final |
|---|---|---|---|
| Control A | No | 0.71 | 1.25 |
| Control B | Yes | 1.50 | 3.53 |
| | | 0.75 | 5.37 |
| | | 1.08 | 4.60 |
| Control C | No | 3.24 | 4.24 |
| | | 2.82 | 3.21 |
| | | 0.65 | 2.09 |

TABLE 8-continued

| | | | |
|---|---|---|---|
| 2.5% PURITY GUM 59 | Yes | 1.12 | 1.34 |
| | | 1.23 | 1.29 |
| | | 1.41 | 1.83 |
| 5% PURITY GUM 59 | Yes | 1.01 | 1.56 |
| | | 1.16 | 1.87 |
| | | 0.57 | 1.09 |
| 5% PURITY GUM 59 (Control D) | No | 0.93 | 1.74 |
| | | 1.88 | 2.10 |
| | | 1.44 | 2.10 |
| 10% PURITY GUM 59 | Yes | 1.19 | 1.36 |
| | | 1.16 | 2.17 |
| | | 0.76 | 2.15 |

| Samples | Increase of macro-contamination area (cm$^2$) | Corrected density increase (#/cm$^2$) | Average density increase (#/cm$^2$) |
|---|---|---|---|
| Control A | 0 | 0.54 | 0.54 |
| Control B | 3 | 2.19 | 3.65 ± 1.38 |
| | 4 | 4.94 | |
| | 3 | 3.83 | |
| Control C | 2 | 1.19 | 1.03 ± 0.54 |
| | 1 | 0.43 | |
| | 1 | 1.47 | |
| 2.5% PURITY GUM 59 | 0 | 0.22 | 0.23 ± 0.18 |
| | 0 | 0.05 | |
| | 0 | 0.42 | |
| 5% PURITY GUM 59 | 0 | 0.55 | 0.60 ± 0.10 |
| | 0 | 0.72 | |
| | 0 | 0.53 | |
| 5% PURITY GUM 59 (Control D) | 0 | 0.82 | 0.57 ± 0.31 |
| | 0 | 0.22 | |
| | 0 | 0.67 | |
| 10% PURITY GUM 59 | 0 | 0.17 | 0.85 ± 0.62 |
| | 0 | 1.01 | |
| | 0 | 1.38 | |

TABLE 9

| Samples | Contaminated with particles | Particle density (#/cm$^2$) Initial | final |
|---|---|---|---|
| Control A | No | 0.21 | 0.03 |
| Control B | Yes | 0.17 | 1.54 |
| | | 0.04 | 2.80 |
| | | 0.06 | 1.84 |
| Control C | No | 0.72 | 1.00 |
| | | 1.38 | 0.48 |
| | | 0.10 | 0.33 |
| 2.5% PURITY GUM 59 | Yes | 0.08 | 0.22 |
| | | 0.07 | 0.11 |
| | | 0.21 | 0.14 |
| 5% PURITY GUM 59 | Yes | 0.07 | 0.10 |
| | | 0.22 | 0.19 |
| | | 0.11 | 0.13 |
| 5% PURITY GUM 59 (Control D) | No | 0.11 | 0.15 |
| | | 0.66 | 0.66 |
| | | 0.19 | 0.19 |
| 10% PURITY GUM 59 | Yes | 0.08 | 0.15 |
| | | 0.10 | 0.07 |
| | | 0.25 | 0.15 |

| Samples | Increase of macro-contamination area (cm$^2$) | Corrected density increase (#/cm$^2$) | Average density increase (#/cm$^2$) |
|---|---|---|---|
| Control A | 0 | −0.18 | −0.18 ± 0.0 |
| Control B | 3 | 1.44 | 2.09 ± 0.76 |
| | 4 | 2.92 | |
| | 3 | 1.92 | |
| Control C | 2 | 0.33 | −0.11 ± 0.68 |
| | 1 | −0.89 | |
| | 1 | 0.24 | |

TABLE 9-continued

| | | | |
|---|---|---|---|
| 2.5% PURITY GUM 59 | 0 | 0.14 | 0.04 ± 0.10 |
| | 0 | 0.04 | |
| | 0 | −0.07 | |
| 5% PURITY GUM 59 | 0 | 0.03 | 0.00 ± 0.03 |
| | 0 | −0.03 | |
| | 0 | 0.01 | |
| 5% PURITY GUM 59 (Control D) | 0 | 0.04 | 0.01 ± 0.02 |
| | 0 | 0.00 | |
| | 0 | 0.00 | |
| 10% PURITY GUM 59 | 0 | 0.07 | −0.02 ± 0.08 |
| | 0 | −0.03 | |
| | 0 | −0.10 | |

TABLE 10

| Samples | Contaminated with particles | Particle density (#/cm$^2$) initial | Particle density (#/cm$^2$) final |
|---|---|---|---|
| Control A | No | 0.51 | 0.58 |
| | | 1.05 | 1.47 |
| | | 0.66 | 0.50 |
| Control B | Yes | 1.01 | 5.34 |
| | | 1.15 | 3.32 |
| | | 1.09 | 5.05 |
| Control C | No | 0.87 | 1.51 |
| | | 0.93 | 0.94 |
| | | 0.72 | 1.70 |
| 5% PURITY GUM 59 + 0.2% Cetyltrimethyl-ammonium bromide | Yes | 0.46 | 3.61 |
| | | 0.54 | 1.41 |
| | | 1.14 | 0.79 |
| 2.5% CRYSTAL TEX 627 | Yes | 0.39 | 1.36 |
| | | 1.95 | 1.68 |
| | | 2.85 | 3.34 |
| 5% CRYSTAL TEX 627 | Yes | 0.58 | 0.82 |
| | | 0.61 | 0.69 |
| | | 0.64 | 0.76 |
| 5% CRYSTAL TEX 627 (Control D) | No | 0.62 | 0.94 |
| | | 1.40 | 2.05 |
| | | 0.48 | 1.00 |
| 10% CRYSTAL TEX 627 | Yes | 0.97 | 1.27 |
| | | 1.43 | 1.37 |
| | | 1.32 | 1.23 |
| 2.5% EMSIZE CMS60 | Yes | 0.57 | 1.63 |
| | | 0.72 | 2.49 |
| | | 1.30 | 1.83 |
| 2.5% EMSIZE CMS60 (Control D) | No | 0.79 | 1.23 |
| | | 1.32 | 1.47 |
| | | 0.83 | 0.76 |

| Samples | Increase of macro-contamination area (cm$^2$) | Corrected density increase (#/cm$^2$) | Average density increase (#/cm$^2$) |
|---|---|---|---|
| Control A | 0 | 0.07 | 0.24 ± 0.25 |
| | 0 | 0.42 | |
| | 0 | −0.17 | |
| Control B | 4 | 4.86 | 3.76 ± 1.35 |
| | 1 | 2.25 | |
| | 2 | 4.16 | |
| Control C | 1 | 0.66 | 0.57 ± 0.49 |
| | 2 | 0.04 | |
| | 1 | 1.02 | |
| 5% PURITY GUM 59 + 0.2% Cetyltrimethyl-ammonium bromide | 9 | 3.67 | 1.40 ± 1.96 |
| | 1 | 0.89 | |
| | 0 | −0.35 | |
| 2.5% CRYSTAL TEX 627 | 2 | 1.01 | 0.41 ± 0.65 |
| | 0 | −0.28 | |
| | 0 | 0.51 | |
| 5% CRYSTAL TEX 627 | 0 | 0.24 | 0.15 ± 0.08 |
| | 0 | 0.08 | |
| | 0 | 0.12 | |

TABLE 10-continued

| | | | |
|---|---|---|---|
| 5% CRYSTAL TEX 627 (Control D) | 0 | 0.32 | 0.49 ± 0.17 |
| | 0 | 0.65 | |
| | 0 | 0.51 | |
| 10% CRYSTAL TEX 627 | 0 | 0.30 | 0.06 ± 0.22 |
| | 0 | −0.06 | |
| | 0 | −0.08 | |
| 2.5% EMSIZE CMS60 | 0 | 1.07 | 1.11 ± 0.64 |
| | 0 | 1.77 | |
| | −2 | 0.49 | |
| 2.5% EMSIZE CMS60 (Control D) | 0 | 0.44 | 0.18 ± 0.26 |
| | 0 | 0.15 | |
| | 0 | −0.07 | |

TABLE 11

| Samples | Contaminated with particles | Particle density (#/cm$^2$) initial | Particle density (#/cm$^2$) final |
|---|---|---|---|
| Control A | No | 0.06 | 0.06 |
| | | 0.24 | 0.29 |
| | | 0.15 | 0.10 |
| Control B | Yes | 0.03 | 2.15 |
| | | 0.07 | 1.58 |
| | | 0.08 | 1.73 |
| Control C | No | 0.08 | 0.42 |
| | | 0.01 | 0.21 |
| | | 0.06 | 0.36 |
| 5% PURITY GUM 59 + 0.2% Cetyltrimethyl-ammonium bromide | Yes | 0.07 | 1.19 |
| | | 0.06 | 0.14 |
| | | 0.07 | 0.04 |
| 2.5% CRYSTAL TEX 627 | Yes | 0.04 | 0.35 |
| | | 0.07 | 0.00 |
| | | 0.03 | 0.18 |
| 5% CRYSTAL TEX 627 | Yes | 0.07 | 0.08 |
| | | 0.06 | 0.08 |
| | | 0.04 | 0.07 |
| 5% CRYSTAL TEX 627 (Control D) | No | 0.07 | 0.13 |
| | | 0.07 | 0.18 |
| | | 0.10 | 0.25 |
| 10% CRYSTAL TEX 627 | Yes | 0.10 | 0.06 |
| | | 0.13 | 0.17 |
| | | 0.04 | 0.01 |
| 2.5% EMSIZE CMS60 | Yes | 0.07 | 0.18 |
| | | 0.06 | 0.28 |
| | | 0.03 | 0.13 |
| 2.5% EMSIZE CMS60 (Control D) | No | 0.07 | 0.04 |
| | | 0.06 | 0.13 |
| | | 0.07 | 0.10 |

| Samples | Increase of macro-contamination area (cm$^2$) | Corrected density increase (#/cm$^2$) | Average density increase (#/cm$^2$) |
|---|---|---|---|
| Control A | 0 | 0.00 | 0.00 ± 0.06 |
| | 0 | 0.06 | |
| | 0 | −0.06 | |
| Control B | 4 | 2.35 | 1.87 ± 0.42 |
| | 1 | 1.55 | |
| | 2 | 1.72 | |
| Control C | 1 | 0.34 | 0.29 ± 0.07 |
| | 2 | 0.20 | |
| | 1 | 0.31 | |
| 5% PURITY GUM 59 + 0.2% Cetyltrimethyl-ammonium bromide | 9 | 1.29 | 0.45 ± 0.73 |
| | 1 | 0.08 | |
| | 0 | −0.03 | |
| 2.5% CRYSTAL TEX 627 | 2 | 0.31 | 0.13 ± 0.19 |
| | 0 | −0.07 | |
| | 0 | 0.16 | |
| 5% CRYSTAL TEX 627 | 0 | 0.01 | 0.02 ± 0.01 |
| | 0 | 0.03 | |
| | 0 | 0.03 | |

TABLE 11-continued

| | | | |
|---|---|---|---|
| 5% CRYSTAL TEX 627 (Control D) | 0 | 0.06 | 0.11 ± 0.05 |
| | 0 | 0.11 | |
| | 0 | 0.15 | |
| 10% CRYSTAL TEX 627 | 0 | −0.04 | −0.01 ± 0.04 |
| | 0 | 0.04 | |
| | 0 | −0.03 | |
| 2.5% EMSIZE CMS60 | 0 | 0.11 | 0.14 ± 0.07 |
| | 0 | 0.22 | |
| | −2 | 0.10 | |
| 2.5% EMSIZE CMS60 (Control D) | 0 | −0.03 | 0.02 ± 0.05 |
| | 0 | 0.07 | |
| | 0 | 0.03 | |

TABLE 12

| Samples | Rms | Ra |
|---|---|---|
| Control A | 0.325 | 0.250 |
| | 0.310 | 0.242 |
| 2.5% PURITY GUM 59 | 0.308 | 0.245 |
| | 0.281 | 0.222 |
| 5.0% PURITY GUM 59 | 0.224 | 0.178 |
| | 0.224 | 0.176 |
| 5.0% CRYSTAL TEX 627 | 0.278 | 0.222 |
| | 0.260 | 0.206 |
| 2.5% EMSIZE CMS 60 | 0.272 | 0.216 |
| | 0.272 | 0.216 |

TABLE 13

| Samples | Al | Si | Ba | Ca | N | O | Sr | Na |
|---|---|---|---|---|---|---|---|---|
| Control A | 6.5 | 27.3 | 0.6 | 0.7 | 0.6 | 64.2 | 0.3 | — |
| 2.5% PURITY GUM 59 | 7.1 | 27.7 | 0.6 | 0.9 | 0.9 | 62.5 | 0.3 | — |
| 5.0% PURITY GUM 59 | 6.6 | 25.9 | 0.6 | 0.8 | 0.4 | 65.4 | 0.3 | — |
| 5.0% CRYSTAL TEX 627 | 6.5 | 27.1 | 0.6 | 0.8 | 0.3 | 64.4 | 0.3 | — |
| 2.5% EMSIZE CMS 60 | 5.9 | 24.5 | 0.6 | 0.7 | 0.8 | 67.1 | 0.2 | 0.2 |

TABLE 14

| Samples | Aging period (weeks) | Macro-contamination (%) | Particle density (particles/cm²) |
|---|---|---|---|
| Uncoated control | 4 | 3.2 | 0.56 ± 0.27 |
| | 8 | 38.8 | −0.12 ± 0.44 |
| | 13 | 90.6 | 17.85 ± 14.97 |
| 5% CRYSTAL TEX 627 | 4 | None | 0.02 ± 0.02 |
| | 8 | None | −0.68 ± 0.17 |
| | 13 | None | 0.05 ± 0.03 |

TABLE 15

| | Al | Si | Ba | Ca | N | O | Sr | B | AFM |
|---|---|---|---|---|---|---|---|---|---|
| Baseline | 6.2 | 26.1 | 0.6 | 0.8 | 0.9 | 61.7 | 0.3 | 3.5 | 0.27–0.36 |
| 4 weeks | 6.0 | 26.3 | 0.3 | 0.6 | 1.2 | 62.8 | <0.3 | 2.6 | 0.30 |
| 8 weeks | 5.9 | 26.3 | 0.3 | 0.6 | 1.3 | 62.7 | <0.3 | 2.8 | 0.28 |
| 13 weeks | 5.4 | 26.2 | 0.5 | 0.6 | 1.6 | 61.6 | <0.3 | 4.1 | 0.32 |

What is claimed is:

1. A method for temporarily protecting glass from glass chips and/or scratching, said glass having at least one substantially flat surface, said method comprising:
   (A) protecting the surface by:
      (i) applying an aqueous solution comprising at least one polysaccharide to the surface, said surface having a contact angle less than or equal to 8° prior to the application of said aqueous solution; and
      (ii) removing water from the aqueous solution to leave a polysaccharide-containing coating on the surface having a thickness of at least 0.01 microns; and
   (B) subsequently removing the polysaccharide-containing coating from surface using an aqueous solution;
   wherein the at least one polysaccharide of step (A) and the aqueous solution of step (B) are chosen so that the surface has a contact angle after step (B) which is less than or equal to 8°.

2. The method of claim 1 wherein after step (B), the surface has a RMS surface roughness as measured by atomic force microscopy which is less than or equal to 0.36 nanometers.

3. The method of claim 1 wherein the at least one polysaccharide comprises straight chain polysaccharide molecules and branched polysaccharide molecules.

4. The method of claim 1 wherein the at least one polysaccharide comprises at least one starch.

5. The method of claim 4 wherein the at least one starch comprises straight chain starch molecules and branched starch molecules.

6. The method of claim 1 wherein step (A) is performed as part of the manufacturing process for the glass.

7. The method of claim 6 wherein the manufacturing process produces newly formed glass at an elevated temperature and steps (A)(i) and (A)(ii) are performed substantially simultaneously by applying the aqueous solution to the newly formed glass at a point in the manufacturing process where the temperature of the newly formed glass just prior to contact with the aqueous solution is above 150° C.

8. The method of claim 7 wherein the temperature of the newly formed glass just prior to contact with the aqueous solution is below 300° C.

9. The method of claim 7 wherein the temperature of the newly formed glass just prior to contact with the aqueous solution is below 250° C.

10. The method of claim 7 wherein the glass is vertical in step (A) and the temperature of the glass remains sufficiently high throughout step (A) so that drips do not form on the surface.

11. The method of claim 10 wherein the temperature of the glass is at least 100° C. at the end of step (A).

12. The method of claim 1 wherein in step (A)(i), the aqueous solution is applied to the surface by spraying.

13. The method of claim 1 wherein in step (A)(i), the aqueous solution is heated before being applied to the surface.

14. The method of claim 1 comprising the additional steps between steps (A) and (B) of:
(a) cutting the glass; and
(b) grinding and/or polishing at least one edge of the cut glass; wherein:
water or a water-containing solution is applied to the coated surface during at least one of steps (a) and (b);
the surface of the coating has a first contact angle prior to steps (a) and (b) and a second contact angle after steps (a) and (b); and
the first and second contact angles differ by less than 5°.

15. The method of claim 1 wherein the concentration of the polysaccharide in the aqueous solution of step (A)(i) is between 0.1 weight percent and 30 weight percent.

16. The method of claim 1 wherein the viscosity of the aqueous solution of step (A)(i) is between 0.1 centipoise and 100 centipoise.

17. The method of claim 1 wherein the aqueous solution of step (A)(i) comprises a biocide.

18. The method of claim 1 wherein the aqueous solution of step (A)(i) comprises a plasticizer.

19. The method of claim 1 wherein the polysaccharide-containing coating has a thickness of less than 50 microns.

20. The method of claim 1 wherein polysaccharide-containing coating has a thickness of between 0.1 microns and 20 microns.

21. The method of claim 1 wherein the aqueous solution of step (B) comprises a detergent.

22. The method of claim 1 wherein step (B) comprises one or more of: heating the aqueous solution of step (B), applying ultrasonic energy to the coating, and/or brush washing the surface.

23. The method of claim 1 wherein the coating reduces the number of glass chips adhered to the surface by at least 90 percent compared to the number of glass chips adhered to an uncoated surface under comparable conditions.

24. The method of claim 23 wherein the number of glass chips adhered to the surface is reduced by at least 95 percent.

25. The method of claim 1 wherein the glass has two substantially flat surfaces and the coating is formed on both surfaces in step (A).

26. The method of claim 1 wherein after step (B), the glass is used to make a liquid crystal display.

* * * * *